United States Patent Office 3,834,919
Patented Sept. 10, 1974

3,834,919
SOLID DEFOAMER FOR STARCH
Edward T. Parker, Inkster, Mich., assignor to BASF Wyandotte Corporation, Wyandotte, Mich.
No Drawing. Filed June 27, 1973, Ser. No. 373,995
The portion of the term of the patent subsequent to Apr. 30, 1991, has been disclaimed
Int. Cl. C08b 27/04, 27/42
U.S. Cl. 106—214    3 Claims

ABSTRACT OF THE DISCLOSURE

A solid, particulate defoamer consisting of a diatomaceous earth and a surface active mixture of conjugated polyoxyethylene - polyoxypropylene compounds when added during manufacture of starch controls the amount of foam produced when using aqueous slurries of the starch as a surface sizing agent for various grades of paper, or as a binder for pigmented coatings for papers and other cellulosic fibrous products.

BACKGROUND

1. Field of the Invention

This invention relates to the control of foam resulting from the use of aqueous slurries of starch in the manufacture of paper and other cellulosic fibrous products.

2. Description of the Prior Art

Foam control in the paper industry has presented a variety of problems over the years depending on what part of the papermaking operation was being considered. U.S. Pat. 3,705,860 discloses a means of controlling foam in papermaking black liquor by the use of a paraffin wax, non-polar oil, silica, zinc stearate and polymethylsiloxane mixture. An earlier patent, U.S. 3,180,836, discloses controlling foaming in the black liquor by the use of an oxyethylated, oxypropylated or oxyethyl-oxypropylated castor oil.

Yet another patent, U.S. 3,215,635, discloses a defoaming composition for papermaking trade comprised of a hydrocarbon, such as mineral oil, a fatty acid having from about 6 to 24 carbon atoms, a fatty alcohol having from about 6 to 22 carbon atoms, a saturated monohydroxy alcohol such as isopropanol and an oxyalkylated phenol such as dodecylphenol condensed with 10 moles of ethylene oxide and 7.6 moles of propylene oxide.

U.S. Pat. 3,697,439 points out that the differences in temperature, wood used, resin content, agitation rates, production speed, solids' content, charge formulas, etc., all make the objective of supplying one economic defoamer composition for all applications rather illusive.

At this point it seems to be appropriate to point out that the industry, and in particular the paper and pulp industry, places considerable interest on the handling and addition characteristics of a defoamer; better yet, if the separate addition of a defoamer can be avoided. Hence, the desire for the paper and pulp industry to have starch which normally foams when slurried by the papermaker to already contain the desirable amount of defoamer.

SUMMARY OF THE INVENTION

In accordance with this invention there is provided starch for paper and other cellulosic fibrous products consisting essentially of (1) dry, water-soluble, flowable particulate starch and
(2) from two to six pounds per ton of said starch of a dry, flowable particulate defoamer consisting essentially of (a) diatomaceous earth having an average particle size of from about 10 to about 15 microns and an average surface area of from about 1.15 to about 1.35 square meters per gram of earth, and (b) a surface active mixture of conjugated polyoxyethylene-polyoxypropylene compounds containing in their structure nucleus of ethylene glycol, oxyethylene groups and oxypropylene groups, the structure of the compounds being such that all of the oxyethylene groups are present in polyoxyethylene chains that are attached to the nucleus of the ethylene glycol at all the sites of its reactive hydrogen atoms, and all of the oxypropylene groups are present in polyoxypropylene chains that are attached to the polyoxyethylene chains, the average molecular weight of the oxypropylene chains being at least from about 750 to about 2,000 and the oxyethylene groups in the mixture constituting from about 70 to about 90 weight percent of the mixture; said surface active compounds being present in an amount from about 10 to about 35 weight percent of the defoamer whereby when said starch is used in preparing a slurry of said starch and water at a temperature greater than the cloud point of said surface active compound the otherwise produced foam is controlled and suppressed by said defoamer.

DESCRIPTION OF THE PREFERRED EMBODIMENTS

The present invention is applicable to paper, pulp fibers and other cellulosic fibers whether used as a component of paper or for textile purposes. Cellulosic fibers include natural cellulosic fibers such as cotton, linen, flax or ramine fibers, and regenerated cellulose staple fibers or filaments produced by the viscose or cuprammonium process.

In its raw state, native starch occurs in the form of hard, dense granules which are practically insensitive to water which have little or no value as an adhesive. Starch must be treated chemically in order to prepare acceptable coating adhesives. The starch so treated is generally referred to as modified starch. This modification may be done by acidic or enzymatic hydrolysis, derivatization, oxidation or dextrinization. Sources of starch suitable for modification and use in this invention include starch derived from corn, wheat, potato, sago, rice, grain sorghum, waxy grain sorghum, waxy maize, tapioca, and mixtures thereof, with wheat, rice and corn starches being preferred. For the sake of brevity, incorporated herein by reference as though it had been fully set out hereinafter is description of these starches and their modification contained in *Starch and Starch Products in Paper Coating*, TAPPI Monograph Series—No. 17, Technical Association of the Pulp and Paper Industry, New York, N.Y. (1957), at pages 17 through 53.

The defoamer of this invention is a dry, particulate powder defoamer. It has been found that the particulate powder form is necessary for proper dispersion and distribution of the defoamer in the dry starch. Liquids and pastes are not dispersible in the dry starch and as a result the so-prepared starch when subsequently used is unsatisfactory.

The defoamer of this invention consists essentially of (1) a diatomaceous earth having closely defined properties and (2) a surface active mixture of conjugated polyoxyethylene - polyoxypropylene compounds, hereinafter more fully described and present in an amount of from about 10 to about 35 weight percent of the total defoamer and preferably in an amount from about 15 to about 25 weight percent.

It was surprising to discover that not only the kind but size and surface area of the carrier for the surface active compounds was critical to the success of this invention. The carrier is diatomaceous earth having an average particle size of from about 10 to about 15 microns, preferably about 12 to 12.5 microns, and an average surface area of from about 1.15 to about 1.35 square meters per gram of said earth. Finer and/or coarser diatomaceous earths and other carriers have failed to achieve the beneficial results of this invention.

The surface active conjugated polyoxyethylene-polyoxypropylene compounds of this invention are sequential oxyethylation, oxypropylation products of ethylene glycol nucleus compounds. The surface active compositions of this invention contain a block of oxyalkylene groups in a chain connected to a block of different oxyalkylene groups in a chain, thus providing the conjugated or repeated unit structure which is necessary for hydrophobic and hydrophilic properties. As has been noted, the starting material for preparing the surface active compositions of this invention is ethylene glycol.

The initially produced poloxyethylene polyol corresponds to the structure

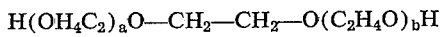

wherein $a+b$ has a value such that the weight of the oxyethylene groups constitutes from about 70 to about 90 weight percent of the final oxyethylene-oxypropylene composition. Very suitable compositions for use in this invention are obtained wherein the oxyethylene groups constitute about 85 weight percent of the final composition.

The final surface active composition is produced by condensing propylene oxide with the above-described polyoxyethylene ethylene glycol described above. A sufficient quantity of propylene oxide is employed so that the molecular weight of each oxypropylene chain is at least about 750. The molecular weight of oxypropylene chains can be up to about 2,000. Very desirable surface active compounds are obtained when the oxypropylene chain has a weight of about 1,250. Further details regardin resulting properties and methods of preparing the surface active compounds are disclosed in U.S. Pat. 3,036,118. For the sake of brevity in this application, the disclosure of said patent is incorporated herein by reference as though it was hereinafter set forth in full text.

The defoamer composition is prepared by blending in conventional mixing apparatus, such as a ribbon blender, the diatomaceous earth and surface active compound. The mixing is carried out under ambient room conditions with said earth being charged first, followed by adding the liquid surface active compound. After blending to a dry, particulate powder, the defoamer is ready for blending with the previously prepared starch. This dry blending with starch is usually carried out by the starch manufacturer as the last step before packaging or loading the starch out for shipment to the consuming paper manufacturer and the like. With one ton of starch is dry blended from two to six and preferably two to four pounds of the defoamer of this invention. Thereafter, the customer prepares starch solution without the heretobefore foam problems.

The following examples are included to illustrate the preparation of the compositions of this invention but are not to be considered limiting. Unless otherwise specified, all parts are by weight and all temperatures are degrees centigrade.

METHOD OF PREPARATION OF POWDER DEFOAMERS

Defoamers were prepared in the laboratory using a mechanical mixer. The mixer consists of a stainless steel pan which is bottom driven, and so mounted that the pan bottom is at 10–12 degrees to the horizontal. A stationary "L" shaped plow rides against both the bottom and the sidewall of the pan. The pan is driven by a small Lightnin stirrer, speed controlled by a Variac Transformer.

A weighed amount of the inorganic carrier under evaluation (50 grams) is placed in the pan and the mixer rotated a speed just sufficient to avoid spillovers. The surfactant is added slowly—dropwise.

METHOD OF TESTING FLOWABLE DEFOAMERS

1. Three hundred grams of the selected starch are weighed out into a suitable container.
2. The calculated amount of powder defoamer to give the specified amount of 100% active surfactant is weighed out to 0.01 gram.
3. The defoamer is mixed with the dry starch until no sign of discrete defoamer particles is evident. These materials were mixed by hand agitation. This mixture of starch and defoamer is placed in the starch cooker.
4. Cold water (2,700 milliliters) is placed in the starch cooker and the agitator, cover, and thermometer are positioned.
5. The stirrer is started and steam turned on at such a rate that the slurry will reach 190° F. in five minutes. When this temperature is reached the steam is turned off and the solution held for two to three minutes under agitation.
6. The hot starch solution is transferred to a second container and the starch cooker washed up.
7. A volume of starch sufficient to give 500 milliliters of starch at the desired concentration is taken and diluted, if necessary, with hot or cold water to bring the solution into the required temperature range.
8. This 500-milliliter sample is placed in a Waring Blendor, covered, and agitated for 30 seconds.
9. The foaming sample is poured into a liter graduate, a stop watch is started, and the height of foam measured and recorded. The height of the foam is measured at the end of one minute, and at the end of three minutes if the foam level has not broken before this time, and these values are recorded as well as the initial temperature of the solution.
10. Break rates are calculated as follows:

$$\frac{\text{Initial Foam Height} - \text{Foam Height in Time Specified}}{\text{Time Specified in Minutes}} = \text{Break Rate.}$$

11. Run at least five foam tests and average.

FLOWABLE DEFOAMERS

1. The carrier was a diatomaceous earth having an average particle size of 12 microns and an average surface area of about 1.25 square meters per gram. (This material is available under the trademark Cellite 110.) The surface active compound prepared according to U.S. Pat. 3,036,118 had a nucleus of ethylene glycol to which were attached polyoxyethylene chains at all sites of its reactive hydrogen atoms and a polyoxypropylene chain attached to each polyoxyethylene chain. The oxypropylene chains had an average molecular weight of 1,250 when calculated on a typical hydroxyl value of 41 and assuming a functionality of 2. The oxyethylene groups constituted about 85 weight percent of the surface active compound. The surface active compound was 25 weight percent of the total defoamer. The resulting defoamer was a flowable powder.

2. Same as defoamer No. 1 except the oxyethylene groups constituted about 75 weight percent of the surface active compound.

3. Same as defoamer No. 1 except the oxypropylene chains had an average molecular weight of 1,650 when calculated on a typical hydroxyl value of 35 and assuming a functionality of 2.

4. Same as defoamer No. 3 except the oxyethylene groups constituted about 75 weight percent of the surface active compound.

EVALUATION OF FLOWABLE DEFOAMERS [1]

| Defoamer | None | No. 2 | Comparative [2] |
|---|---|---|---|
| Temperature of starch solution, °C | 56 | 62 | 59 |
| Initial foam height, ml | 102 | 43 | 54 |
| Foam height, ml.: | | | |
| Break in seconds | | 20 | 17 |
| One minute | | 0 | 17 |
| Three minutes | 15 | 0 | 17 |
| Residual | | 0 | 17 |
| Breaking rate, ml./min | 29 | 134 | 37 |

[1] The defoamers were evaluated at the rate of four pounds of defoamer per ton of starch. The starch used in these tests is considered representative of the grades of starch used for tub sizing in the paper industry and is sold under the trademark Cato Bond 160.

[2] A commercial product having a ground calcium silicate carrier, the surface active material being polyoxypropylene capped with polyoxyethylene chains which comprise about 9 weight percent of the total compound and a total molecular weight of about 1,900.

Similar results are obtained when defoamer No. 1 is tested in the above fashion. Under the same test, defoamers No. 3 and No. 4 give very effective results.

The powdered defoamers of this invention show good foam inhibition and excellent foam breaking properties at temperatures equal to or above their respective cloud points. As seen from the above data, their breaking rate is significantly greater than the control or a typical commercial product now available. Since the cloud points of the invented defoamers is lower than the temperatures employed in industry in preparing and using the starch slurries, the invented defoamers can be used to great advantage. However, at ambient temperatures (circa 20° C.—25° C.) the invented defoamers exhibit foam producing properties and only moderate foam breaking properties.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. In the production of paper and other cellulosic fibrous products with a water-soluble starch slurry the improvement which comprises adding to and admixing with dry, water-soluble flowable starch from two to six pounds per ton of starch of a dry, flowable powder defoamer consisting essentially of (a) diatomaceous earth having an average particle size of from about 10 to about 15 microns and an average surface area of from about 1.15 to about 1.35 square meters per gram of said earth, and (b) a surface active mixture of conjugated polyoxyethylene-polyoxpropylene compounds containing in their structure nucleus of ethylene glycol, oxyethylene groups and oxypropylene groups, the structure of the compounds being such that all of the oxyethylene groups are present in polyoxyethylene chains that are attached to the nucleus of the ethylene glycol at all the sites of its reactive hydrogen atoms, and all of the oxypropylene groups are present in polyoxypropylene chains that are attached to the polyoxyethylene chains, the average molecular weight of the oxypropylene chains being at least from about 750 to about 2,000 and the oxyethylene groups in the mixture constituting from about 70 to about 90 weight percent of the mixture; said surface active compounds being present in an amount from about 10 to about 35 weight percent of the defoamer whereby when said starch is used in preparing a slurry of said starch and water at a temperature greater than the cloud point of said surface active compound for use on and with said fibrous products the otherwise produced foam is controlled and suppressed by said defoamer.

2. The process of claim 1 wherein the average molecular weight of the oxypropylene chain in said surface active compound is 1,250.

3. The process of claim 2 wherein the oxyethylene groups constitute about 75 to about 85 weight percent of the mixture of said surface active compounds.

References Cited

UNITED STATES PATENTS

| | | | |
|---|---|---|---|
| 2,914,412 | 11/1959 | Stephan | 106—29 |
| 3,355,366 | 11/1967 | Beard | 252—358 |
| 3,036,118 | 5/1962 | Jackson | 260—484 B |

THEODORE MORRIS, Primary Examiner

U.S. Cl. X.R.

106—213